United States Patent [19]

Chamberlain et al.

[11] 4,153,601

[45] May 8, 1979

[54] 4-HYDROXYQUINOLONE-(2)-AZOMETHINE COPPER COMPLEX PIGMENTS

[75] Inventors: Terence R. Chamberlain, Stewarton; Colin D. Campbell, Beith; James M. McCrae, Stewarton, all of Scotland

[73] Assignee: Ciba-Geigy Corporation, Ardsley, N.Y.

[21] Appl. No.: 810,247

[22] Filed: Jun. 27, 1977

[30] Foreign Application Priority Data

Jun. 30, 1976 [GB] United Kingdom ............... 27356/76

[51] Int. Cl.$^2$ ...................... C07F 1/08; C07D 215/06; C09D 11/00; C09B 57/00
[52] U.S. Cl. .......................................... 546/7; 106/23; 106/288 Q; 106/308 R; 106/308 N; 106/311; 427/385 B; 427/390 R; 427/394; 427/395; 546/110; 546/155; 542/415; 542/420
[58] Field of Search ............ 260/270 B, 270 D, 438.1, 260/270 R, 270 K, 270 Q, 270 PD, 270 T; 106/288 Q

[56] References Cited

U.S. PATENT DOCUMENTS

| | | | |
|---|---|---|---|
| 2,993,884 | 7/1961 | Ruegg et al. | 260/147 |
| 3,677,782 | 7/1972 | Macpherson et al. | 106/288 Q |
| 3,700,709 | 10/1972 | Inman et al. | 260/438.1 |
| 3,766,230 | 10/1973 | Inman et al. | 260/438.1 |
| 3,891,685 | 6/1975 | Hari et al. | 260/438.1 |
| 4,065,481 | 12/1977 | L'Eplattenier et al. | 260/438.1 |

OTHER PUBLICATIONS

Gershuns et al., Chemical Abstracts, vol. 77, #87233q (1972).
McCrae, Chemical Abstracts, vol. 81, #122765w (1974).
L'Eplattenier et al., Chemical Abstracts, vol. 83, #61667h (1975).

*Primary Examiner*—Floyd D. Higel
*Attorney, Agent, or Firm*—Joseph F. DiPrima; Vincent J. Cavalieri

[57] ABSTRACT

A compound having the formula

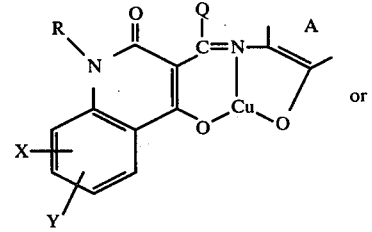

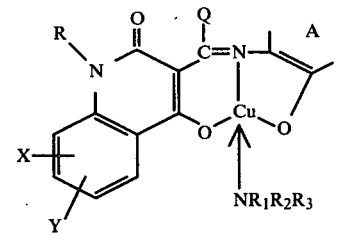

wherein A denotes an optionally substituted aromatic, isocyclic or heterocyclic residue; R is H, an alkyl residue having from 1 to 6 carbon atoms, an aryl residue having from 6 to 10 carbon atoms or an aralkyl residue having from 7 to 10 carbon atoms; Q is H or a methyl group; X and Y are the same or different and each is a non-water solubilizing group, or X and Y together form a fused aromatic ring system; and $R_1$ and $R_2$ are the same or different and each is H or an alkyl radical having from 1 to 22 carbon atoms, and $R_3$ is hydrogen, an alkyl radical having from 1 to 22 carbon atoms or an aryl radical having from 6 to 10 carbon atoms, the alkyl radicals in $R_1$, $R_2$ and $R_3$ being unsubstituted and uninterrupted or being substituted by an OH, $NH_2$ or CN group and/or being interrupted by an ethylenic group or an oxygen, sulphur or nitrogen bridge, or two or all three of $R_1$, $R_2$ and $R_3$ may form, together with the nitrogen atom to which they are attached, a heterocyclic residue, is useful for pigmenting high molecular weight organic material such as a natural or synthetic polymer or copolymer, or a coating composition for application to the surface of an article, or a printing liquid medium to yield shades from greenish yellow to red brown, exhibiting good fastness properties.

4 Claims, No Drawings

4-HYDROXYQUINOLONE-(2)-AZOMETHINE COPPER COMPLEX PIGMENTS

The present invention relates to new, valuable heterocyclic azomethine metal complex pigments and new heterocyclic azomethines of use in the production of metallised pigments.

According to the present invention there is provided a heterocyclic azomethine compound having the formula:

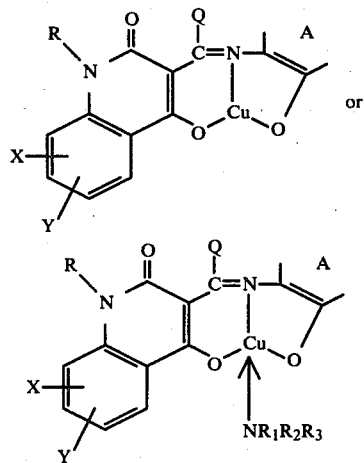

wherein A denotes an optionally substituted aromatic, isocyclic or heterocyclic residue; R is H, an alkyl residue having from 1 to 6 carbon atoms, an aryl residue with 6 to 10 carbon atoms or an aralkyl residue with 7 to 10 carbon atoms; Q is a hydrogen atom or a methyl group; X and Y can be the same or different and each is a non-water solubilising group or X and Y together form a fused aromatic ring system; and $R_1$ and $R_2$ are the same or different and each is hydrogen or an alkyl radical having from 1 to 22 carbon atoms and $R_3$ is hydrogen, an alkyl radical having from 1 to 22 carbon atoms or an aryl radical having from 6 to 10 carbon atoms, the alkyl radicals in $R_1$, $R_2$ and $R_3$ being unsubstituted and uninterrupted or being substituted by an OH, $NH_2$ or CN group and/or being interrupted by an ethylenic group or an oxygen, sulphur or nitrogen bridge, or two or all three of $R_1$, $R_2$ and $R_3$ may form, together with the nitrogen atom to which they are attached, a heterocyclic residue.

Compounds of formula I are preferred.

Examples of such non-water solubilising groups X and Y are hydrogen, halogen, alkyl with 1 to 6 carbon atoms, alkoxy with 1 to 6 carbon atoms, aryloxy with 6 to 10 carbon atoms, aralkyl with 7 to 10 carbon atoms, tri-fluoromethyl or nitro groups.

When A denotes an isocyclic ring system it is preferably a benzene system and when A denotes a heterocyclic system, it is preferably a benzimidazolone or pyridine system.

Optional substituents in residue A are halogen, especially chlorine or bromine; 1-6 C alkyl or alkoxy groups, especially methyl, ethyl, methoxy or ethoxy; 6-10 C aryl groups, especially phenyl or naphthyl; 6-10 C aryloxy, especially phenoxy; 7-10 C aralkyl, especially benzyl; trifluoromethyl; nitro; 2-7 C carboxyalkyl, especially carboxymethyl or carboxyethyl; carboxyl; cyano; 2-6 C alkylamido, especially methylamido or ethylamido; 6-10 C arylamido, especially phenylamido; 2-7 C alkylcarbamoyl, especially methyl- or ethylcarbamoyl; 7-11 C arylcarbamoyl, especially phenylcarbamoyl; 1-6 C alkyl sulphamoyl, especially methyl- or ethyl sulphamoyl; 6-10 C arylsulphamoyl, especially phenylsulphamoyl; 1-6 C alkylsulphonylamino, especially methyl- or ethylsulphonylamino; or 6-10 C arylsulphonylamino, especially phenylsulphonylamino.

Ligands $NR_1R_2R_3$ in the compounds of formula 1A may be primary, secondary or tertiary amines. Examples of amine ligands are 1–18 C optionally substituted alkylamines such as methylamine, ethylamine, propylamine, butylamine, hexylamine, dodecylamine, stearylamine, dimethylamine, diethylamine, trimethylamine, triethylamine, ethylenediamine and ethanolamine; optionally substituted arylamines e.g. aniline, N-methylaniline, N,N-diethylaniline; and heterocycles e.g. pyridine and quinoline.

Of particular interest are those pigments having the formula:

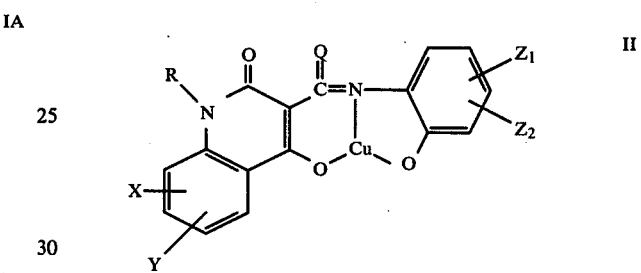

wherein Q, R, X and Y have their previous significance and $Z_1$ and $Z_2$ may be the same or different and each is hydrogen, halogen, alkyl containing 1 to 6 carbon atoms, alkoxy containing 1 to 6 carbon atoms, aryl containing 6 to 10 carbon atoms, aryloxy containing 6 to 10 carbon atoms, aralkyl containing 7 to 10 carbon atoms, trifluoromethyl, nitro, 2–7 C carboxyalkyl, carboxyl, cyano, amido 2–7 C alkylamido, 6–10 C arylamido, 2–7 C alkylcarbamoyl, 7–11 C arylcarbamoyl, 1–6 C alkylsulphamoyl, 6–10 C arylsulphamoyl, 1–6 C alkylsulphonylamino or 6–10 C arylsulphonylamino or the two radicals $Z_1$ and $Z_2$, together with the benzene ring to which they are attached, form a fused isocyclic or heterocyclic ring system for example, a naphthalene, benzimidazolone or quinoline system.

The present invention also provides a process of producing a compound of formula I which comprises reacting a compound having the formula:

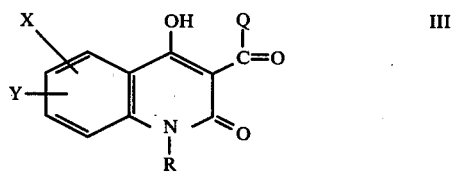

wherein Q, R, X and Y have their previous significance, with an o-oxyamine of formula:

wherein A has its previous significance and $R_4$ is H or methyl to produce an azomethine of formula:

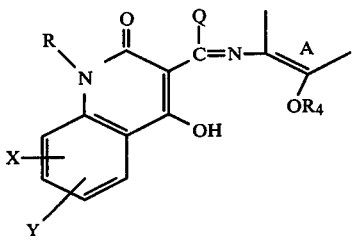

wherein A, Q, R, X, Y and $R_4$ have their previous significance and this product is then metallised.

The present invention also provides a further process for the production of azomethine metal complexes, comprising reacting a compound of formula:

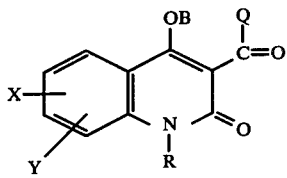

wherein Q, X, Y and R have their previous significance and B is an alkali metal, preferably sodium, with an o-hydroxyamine of formula:

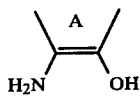

wherein A has its previous significance and then metallising.

Examples of compounds which can be used as coppering agents include acetates, chlorides, sulphates, nitrates and phosphate salts of copper. Alternatively, a solution of cuprammonium salt may be used. Specific examples of suitable compounds for Formula III for use in the processes of the present invention are:
3-formyl-4-hydroxy-2-quinoline
3-formyl-4-hydroxy-1-methyl-2-quinolone
3-formyl-4-hydroxy-1-ethyl-2-quinolone
3-formyl-4-hydroxy-1-n-propyl-2-quinolone
3-formyl-4-hydroxy-1n-butyl-2-quinolone
3-formyl-4-hydroxy-1-phenyl-2-quinolone
3-formyl-4-hydroxy-1-benzyl-2-quinolone
3-acetyl-4-hydroxy-1-methyl-2-quinoline
5,6-benzo-4-hydroxy-3-formyl-1-phenyl-2-quinolone
6,7-benzo-4-hydroxy-3-formyl-1-phenyl-2-quinolone
7,8-benzo-4-hydroxy-3-formyl-1-phenyl-2-quinolone
6-methyl-4-hydroxy-3-formyl-1-phenyl-2-quinolone
6-chloro-4-hydroxy-3-formyl-1-phenyl-2-quinolone
3-acetyl-4-hydroxy-1-methyl-2-quinolone Of the o-oxyamines of formula IV, preferred compounds are those of formula:

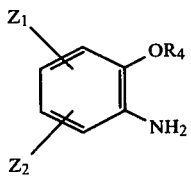

wherein $R_4$, $Z_1$ and $Z_2$ have their previous significance.

The following may be mentioned as examples of such preferred o-oxyamines:
2-aminophenol
2-amino-4-chlorophenol
2-amino-4-nitrophenol
2-amino-5-nitrophenol
o-anisidine
2-methoxy-5-amido aniline
2-methoxy-5-anilido aniline
2-amino-4-phenyl phenol
5-methoxy-4-amino benzimidazolone
2-hydroxy-4-methyl-6-hydroxy-7-amino quinoline
2-amino-3-hydroxy pyridine
5-amino-barbituric acid The processes of the present invention may be effected in a solution or in finely-divided suspension using an organic solvent as the reaction medium. Examples of suitable solvents include methoxyethanol, dimethylformamide, o-dichlorobenzene and nitrobenzene. The reactions are conveniently effected at an elevated temperature, preferably at a temperature between 50° C. and the temperature at which the reaction mixture refluxes.

As a further variation of the process of the present invention, the desired azomethine compound of formula I may be produced under aqueous conditions in the absence of an organic solvent by reacting an alkaline solution of an ortho-aminophenol of formula VII with an alkaline suspension of the carbonyl compound of formula III or VI, acidifying the resultant product (for example with acetic acid) and adding the coppering agent to the suspension of the Schiff's base of formula V so formed. If desired, the azomethine suspension may be filtered, the azomethine paste washed and then resuspended before the addition of the coppering agent. The coppering agent may be aqueous cupric sulphate solution containing sufficient sodium acetate present in solution to maintain the pH value above 3. Alternatively a solution of a cuprammonium salt may be used. Surface active agents may also be used if desired. By this variation of the process of the invention coloured products may be obtained in a finely divided form which are usable directly as pigments.

The present invention also provides a still further process of producing a compound of formula I which comprises reacting an azomethine derivative having the formula:

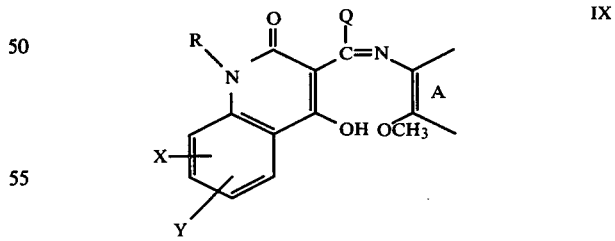

wherein A, Q, R, X and Y have their previous significance, with at least one molecular equivalent proportion of a coppering agent.

The process is conveniently effected in the presence of an organic solvent which is inert under the conditions of the reaction, and as the process entails the splitting of the ether linkage, a higher reaction temperature is in general required than that in the first process of the invention. The preferred reaction temperature is within the range of from 140° C. to 180° C.

The compounds of formula IA may be conveniently produced by reacting a compound of formula I, preferably at a temperature in the range of from 15° to 60° C., with at least an equimolar amount of an amine $NR_1R_2R_3$, wherein $R_1$, $R_2$ and $R_3$ have their previous significance.

If the amine is a liquid, an excess of amine may be used as a reaction solvent; after reaction, the excess amine may then be removed in vacuum or by washing with a suitable solvent and the solid product remaining may be dried, preferably at a temperature below 60° C., to avoid the risk of caking or decomposition.

If the amine is a solid, an extraneous solvent is preferably used. For example, a low-boiling alcohol may be employed, which may contain a proportion of water, although any non-acidic solvent, e.g. an aromatic hydrocarbon, optionally nitrated or halogenated, may be used provided that the amine is sufficiently soluble therein, and the compound of formula I is insoluble therein.

The compounds of formula I and IA have valuable pigmentary properties and these properties may, if desired, be improved by conventional conditioning methods. The pigments are distinguished by their high colour strength, high resistance to solvents, outstandingly good lightfastness in paints, inks and plastics, excellent fastness to over-lacquering and excellent durability.

Accordingly, the present invention also provides a process of producing a pigment which comprises conditioning of a substituted azomethine compound of formula I or IA. The present invention also comprises pigments so produced, and organic material coloured by the pigments of the invention.

Known conditioning techniques may be used, for example, grinding with calcium chloride, sodium chloride or other organic or inorganic salt, with or without the addition of dimethylaniline, xylene, or other organic solvent; or heating with a high-boiling organic solvent, for instance, nitrobenzene or α-chloronaphthalene. The compounds of formula I or IA may also be dispersed in water if desired, for example, by means of pebble milling in the presence of a surface active agent which may be of the anionic, cationic or non-ionic type.

The desired azomethine compound of formula I or IA need not be pre-formed before the conditioning is carried out; it may be prepared during the course of the conditioning procedure. For example, the desired azomethine compound of formula I may be produced by reacting together an ortho-aminophenol of formula VII with the compound of formula III and then adding a coppering agent while conditioning is carried out simultaneously, for instance in a horizontally rotating gravity grinder (for example, a ball-mill), a grinder operated by a vertically rotating shaft, especially a sand grinder, or in a grinder operated by vibratory action or by any other comminution method compatible with the presence of the chemical reactants. In this type of conditioning, a water soluble copper salt such as cupric sulphate, conveniently in the hydrated form, is particularly suitable as the coppering agent, especially in the presence of an acid buffer such as sodium acetate. If desired, a surface-active agent may also be used in these conditioning techniques.

The pigments produced in accordance with this invention may be of a shade ranging from greenish yellow to red brown.

The pigments of this invention are suitable for use in the pigmentation, by known methods, of high molecular weight hydrophobic organic material, for instance paints, lacquers, printing inks, rubber, synthetic polymeric materials, paper and textile materials. In general, pigments of this invention exhibit good fastness properties, especially to light, heat, cross lacquering and migration and resistance to organic solvents, such as trichloroethylene, toluene and methylethylketone.

The present invention also comprises the colouration of an organic material with a substituted azomethine compound of formula I or IA, together with organic materials when so coloured.

The colouration may be carried out, for example, by preparing the substituted azomethine compound of formula I or IA in a finely divided state and incorporating it into the organic material in a conventional manner. The pigment may be prepared in a finely divided state, for instance, by milling with anhydrous sodium acetate in the presence of a minor proportion of xylene, or by other conventional pigment conditioning procedures.

The high molecular weight hydrophobic organic material or other organic material to be coloured according to the invention may be any polymeric or other organic material capable of being pigmented or otherwise coloured. The material may be a natural or synthetic polymer or copolymer, a coating composition for application to the surface of an article, or a printing liquid medium. However, the process of the invention is applicable with particular advantage to the pigmentation of natural or synthetic polymers or copolymers in the form of fibres, films or bulk material; to paints, lacquers and other surface coating compositions, or to tinting compositions for use in preparing such coating compositions; and to printing inks. Examples of polymers or co-polymers which may be pigmented by the process are vinyl chloride or acrylonitrile polymers and copolymers; polyethylene, polypropylene and other polyolefines; polystyrene and polystyrene copolymers; and natural and synthetic rubbers.

The present invention is further illustrated by the following Examples.

EXAMPLE 1

PART A

Preparation of ligand

A mixture of 3-formyl-4-hydroxy-1-methyl-2-quinolone (6.1g.) and 2-amino-phenol (3.3g.) is stirred and refluxed in ethanol (60 ml.) for 2 hours. When cool, the mixture is filtered, washed with ethanol and dried at 50°-60° C. to afford the product as a yellow solid (8.1 g.) mp. 261°-4° C. [91%].

| Analysis | C | H | N |
|---|---|---|---|
| Calculated for $C_{17}H_{14}N_2O_3$ | 69.39 | 4.76 | 9.52 |
| Found | 69.58 | 4.92 | 9.54 |

PART B

Preparation of copper complex

Cupric acetate monohydrate (5.0)g.) is added to a stirred suspension of the yellow product of PART A (7.4g.) in methylcellosolve (150 ml.) and the mixture then heated to reflux for 4 hours. It is filtered hot, washed with hot methylcellosolve then with ethanol and dried at 50°-60° C. to afford a yellow shade-green pigment (8.7g.) of m.p. not less than 360° C.

| Analysis | C | H | N | Cu |
| --- | --- | --- | --- | --- |
| Calculated for $C_{17}H_{12}CuN_2O_5$ | 57.38 | 3.38 | 7.88 | 17.87 |
| Found | 57.03 | 3.51 | 7.73 | 17.40 |

Using the procedure described in Example 1(A), the carbonyl component and the amine component of Examples 2–16 (Table I) were condensed to give the corresponding ligands.

Using the procedure described in Example 1(B), these ligands were then metallised with copper to produce the complexes shown in Table I.

PART B

Preparation of copper complex

A solution of copper sulphate [$CuSO_4.5H_2O$] (12.7g.) in 0.88 ammonia (7.6g.) and water (100 ml.) is added to an efficiently stirred suspension of the yellow product of PART A (13.5g.) in water (300 ml.) containing Solumin F 10S (the sodium salt of sulphated nonylphenoxy polyethoxyethane) (0.4g.). The resultant mixture is heated by steam injection to > 95° C. After 2 hours it is filtered hot, washed with hot water (5000 ml.) and dried at 50°–60° C. to afford a yellow shade green pigment

Table 1

| Example | Carbonyl Component | Amine Component | Yield of Ligand | M.Pt. of Ligand | Colour of Copper Complex in Lacquer | Yield of Complex | Fastness to Light |
| --- | --- | --- | --- | --- | --- | --- | --- |
| 2 | 3-Formyl-4-hydroxy-2-quinolone | 2-Aminophenol | 95% | 296 9° C. | Green-shade yellow | 98% | Excellent |
| 3 | 3-Formyl-4-hydroxy-1-methyl-2-quinolone | 2-Amino-5-($\alpha,\alpha$-di-methylbenzyl)phenol | 90% | >315° C | Green-shade yellow | 71% | Good |
| 4 | 3-Formyl-4-hydroxy-1-methyl-2-quinolone | 2-Amino-4-ethyl-sulphonyl-phenol | 97% | 305°–10° C. | Green-shade yellow | 79% | Excellent |
| 5 | 3-Formyl-4-hydroxy-1-methyl-2-quinolone | 2-Methoxy-4-methyl 5-nitroaniline | 82% | 285°–9° C. | Yellow-shade green | 82% | Excellent |
| 6 | 3-Formyl-4-hydroxy-1-methyl-2-quinolone | 2-Amino-4-chloro-phenol | used directly | | Green-shade yellow | 95% | Excellent |
| 7 | 3-Formyl-4-hydroxy-1-methyl-2-quinolone | 2,5-Dimethoxy-4-benzoylaminoaniline | 84% | >315° C. | Brown | 86% | Good |
| 8 | 3-Formyl-4-hydroxy-1-methyl-2-quinolone | 5-Amino-6-methoxy-benzimidazolone | 88% | >340° C. | Red-shade brown | 46% | Good |
| 9 | 3-Formyl-4-hydroxy-1-ethyl-2-quinolone | 2-Aminophenol | 40% | 315°–20° C. | Green-shade yellow | 93% | Excellent |
| 10 | 3-Formyl-4-hydroxy-1-methyl-6-nitro-2-quinolone | 2-Aminophenol | used directly | | Golden-brown | 62% | Excellent |
| 11 | 3-Formyl-4-hydroxy-1-phenyl-5,6-benzo-quinol-2-one | 2-Aminophenol | 53% | used directly | Golden-brown | 65% | Good/Moderate |
| 12 | 3-Formyl-4-hydroxy-1-phenyl-7,8-benzo-quinol-2-one | 2-Aminophenol | 60% | used directly | Green-shade yellow | 48% | Excellent |
| 13 | 3-Formyl-4-hydroxy-1-phenyl-1-quinolone | 2-Aminophenol | 60% | 313°–17° C. | Green-shade yellow | 93% | Excellent |
| 14 | 3-Acetyl-4-hydroxy-1-methyl-2-quinolone | 2-Aminophenol | 58% | 218°–220° C. | Brown | 81% | Moderate |
| 15 | 3-Acetyl-4-hydroxy-1-phenyl-2-quinolone | 2-Aminophenol | 60% | 257°–259° C. | Green | 86% | Excellent |
| 16 | 3-Formyl-4-hydroxy-1-methyl-2-quinolone | 2-Amino-3-hydroxy-pyridine | 96% | 282° C. (dec) | Green-shade yellow | 98% | Moderate |

(16.2g.) [99%]

| Analysis | Cu |
| --- | --- |
| Calculated for $C_{17}H_{12}CuN_2O_3$ | 17.87 |
| Found | 17.41 |

EXAMPLE 17

PART A

Preparation of ligand

2-Aminophenol (7.3g) is added to a stirred suspension of 3-formyl-4-hydroxy-1-methyl-2-quinolone (13.6g.) in water (100ml) followed by a solution of sodium hydroxide (3.7g.) in water (40 ml.). Sodium bisulphite (17.4g.) is added and the resultant mixture stirred at ambient temperature. After 12 hours the suspension was heated to 80° C. for 1 hour and filtered hot. The solid is washed with hot water (1500 ml.) and dried at 50°–60° C. to afford the product as a yellow solid (19.5g.) mp. 261°–264° C. [100%]

EXAMPLE 18

2-Aminophenol (5.45g.) is added to an efficiently stirred suspension of the sodium salt of 3-formyl-4-hydroxy-1-methyl-2-quinolone (11.25g.) in water (600 ml.) at ambient temperature. Conc. hydrochloric acid (4.3 ml.) is added and the mixture heated by steam injection to >95° C. After 15 minutes a solution of copper sulphate [$CuSO_4.5H_2O$] (13.7g.) in water (125 ml.) is added followed by sodium acetate [$NaOCOCH_3.3H_2O$] (13.6g.). After 1 hour the suspension is filtered hot, washed with hot water (1500 ml.) and dried at 50°–60°

C. to afford a yellow shade green pigment (17.4g.) [97.5%]

| Analysis | C | H | N | Cu |
|---|---|---|---|---|
| Calculated for $C_{17}H_{12}CuN_2O_3$ | 57.38 | 3.38 | 7.88 | 17.87 |
| Found | 57.69 | 3.50 | 7.82 | 17.41 |

EXAMPLE 19

3-formyl-4-hydroxy-1-methyl-2-quinolone (50.75g.), 2-aminophenol (27.25g), anhydrous sodium acetate (43g.) and ½ inch diameter ceramic balls (250g.) were placed in a pot mill and ground for 24 hours. To the mixture was then added hydrated cupric sulphate (63g.) and grinding continued for a further 44 hours. Water was added, the balls sieved off and the product filtered and washed successively with water, dilute aqueous sodium hydroxide solution and water. The product was dried at 60° C., to afford a yellow-shade green pigment.

EXAMPLE 20

A mixture of the metal complex pigment prepared in Example 1(2g.) and pyridine (20 ml.) was stirred at 20° C. for 2 hours, then filtered, washed with a little of the same amine, and the brown amine adduct dried in vacuum.

| | C | H | N |
|---|---|---|---|
| Calculated for $C_{22}H_{17}N_3O_3Cu$ | 60.76 | 3.91 | 9.67 |
| Found | 61.00 | 3.97 | 9.71 |

EXAMPLE 21

By a process similar to that in Example 20, the piperidine adduct of the product of Example 1 was prepared.

| | C | H | N |
|---|---|---|---|
| Calculated for $C_{22}H_{23}N_3O_3CU$ | 59.93 | 5.22 | 9.53 |
| Found | 60.00 | 5.26 | 9.52 |

EXAMPLE 22

By a process similar to that in Example 20, the ethylamine adduct of the product of Example 1 was prepared.

| | C | H | N |
|---|---|---|---|
| Calculated for $C_{19}H_{19}N_3O_3Cu$ | 56.93 | 4.74 | 10.49 |
| Found | 57.00 | 4.74 | 10.48 |

EXAMPLE 23

By a process similar to that in Example 20, the diethylamine adduct of the product of Example 1 was prepared.

| | C | H | N |
|---|---|---|---|
| Calculated for $C_{21}H_{23}N_3O_3Cu$ | 58.81 | 5.37 | 9.80 |
| Found | 58.50 | 5.35 | 9.73 |

EXAMPLE 24

60 parts of the product of Example 17 were ball milled with 136 parts of a solution of an unmodified butylated melamine/formaldehyde resin in n-butanol and 452 parts of xylol. 350 parts of a solution of a hydroxy acrylic resin, a 1:1 mixture of xylene and n-butanol, were added gradually and ball milling continued. The resulting mixture had a pigment to binder ratio 1:5; this was adjusted to 1:10 by the addition of more resin solution and the paint was thinned to the required viscosity for spraying. Aluminium panels were sprayed and then stoved at 120° C. for 30 minutes. The resulting paint films had excellent fastness to light, heat and acids; for example, spotting the panels with 0.1 N hydrochloric acid left no discolouration after drying, and stoving the panels at 180° C. for 30 minutes had practically no detectable effect on the colour. The resulting coated panels were a very attractive transparent greenish yellow colour and could be oversprayed with, for example, a white paint of the same type without the greenish yellow colour bleeding into and thus spoiling the new white finish.

When the stainer (with a 1:5 pigment to binder ratio) whose preparation is described above was combined with a suitable paste of finely powdered aluminium to give a pigment to aluminium ratio of 75:25 and the mixture was again thinned to a suitable viscosity for spraying, very attractive greenish yellow metallic coatings were obtained which also had excellent fastness properties.

In the same way be replacing the product of Example 17 with the products of any of the Examples 2–16 there could be obtained paint films having varying shades of yellow to red. All were however, characterised by having the same excellent fastness properties.

What we claim is:

1. An azomethine copper complex pigment of the formula

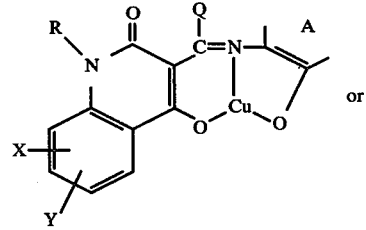

or

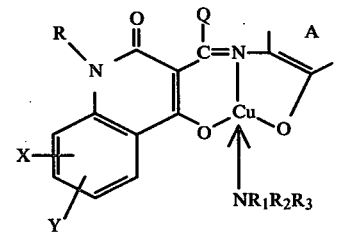

wherein

A represents, together with the ethylenic group to which the azomethine and oxy groups are attached, benzene, benzimidazolone or pyridine which are further unsubstituted or substituted by halo, 1–6 C alkyl, 1–6 C alkoxy, 6–10 C aryl, 6–10 C aryloxy, 7–10 C aralkyl, trifluoromethyl, nitro, 2–7 C carboxyalkyl, carboxyl, cyano, amido, 2–7 C alkylamido, 6–10 C arylamido, 2–7 C alkylcarbamoyl, 7–11 C arylcarbamoyl, 1–6 C alkylsulphamoyl, 6–10 arylsulphamoyl, 1–6 C alkylsulphonylamino, or 6–10 C arylsulphonylamino;

R is hydrogen, 1-6 C alkyl, 6-10 C aryl or 7-10 C aralkyl;

Q is hydrogen or methyl;

X and Y are independently hydrogen, halogen, 1-6 C alkyl, 1-6 C alkoxy, 6-10 C aryloxy, 7-10 C aralkyl, trifluoromethyl or nitro, or X and Y together with the carbon atoms to which they are attached form a benzene ring;

$R_1$, and $R_2$ are independently hydrogen; alkyl or 1-22 carbon atoms which is unsubstituted or substituted by hydroxy, —$NH_2$ or cyano; and $R_3$ is hydrogen; alkyl of 1-22 carbon atoms which is unsubstituted or substituted by hydroxy, $NH_2$ or cyano; or aryl of 6 to 10 carbon atoms; or two or three of $R_1$, $R_2$, and $R_3$ form, together with the nitrogen to which they are attached, pyridine, quinoline of piperidine.

2. Anazomethine copper complex pigment according to claim 1, of the formula

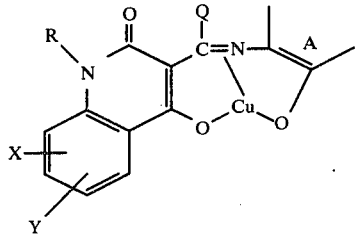

3. An azomethine copper complex pigment according to claim 1, of the formula

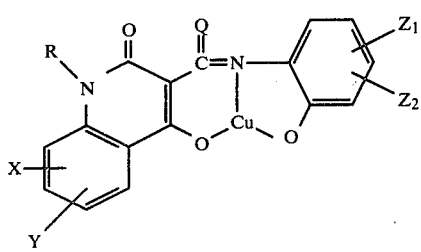

wherein Z, and $Z_2$ are independently hydrogen, halo, 1-6 C alkyl, 1-6 C alkoxy, 6-10 C aryl 6-10 C aryloxy, 7-10 C aralkyl, trifluoromethyl, nitro, 2-7 C carboxyalkyl, carboxy, cyano, amido, 2-7 C alkylamido, 6-10 C arylamido, 2-7 C alkylcarbamoyl, 7-11 C arylcarbamoyl, 1-6 C alkylsulphamoyl, 6-10 C arylsulphamoyl, 1-6 C alkylsulphonylamino or 6-10 C arylsulphonylamino.

4. An azomethine copper complex pigment according to claim 3, wherein X, Y, $Z_1$, $Z_2$ and Q are each hydrogen and R is methyl.

* * * * *